(12) United States Patent
Rhoads et al.

(10) Patent No.: US 7,602,977 B2
(45) Date of Patent: Oct. 13, 2009

(54) DIGITAL WATERMARKS

(75) Inventors: Geoffrey B. Rhoads, West Linn, OR (US); J. Scott Carr, Carlisle, MA (US)

(73) Assignee: Digimarc Corporation, Beaverton, OR (US)

( * ) Notice: Subject to any disclaimer, the term of this patent is extended or adjusted under 35 U.S.C. 154(b) by 217 days.

(21) Appl. No.: 11/544,990

(22) Filed: Oct. 5, 2006

(65) Prior Publication Data

US 2007/0031000 A1    Feb. 8, 2007

Related U.S. Application Data

(60) Continuation of application No. 10/379,393, filed on Mar. 3, 2003, now Pat. No. 7,263,203, which is a continuation of application No. 09/292,569, filed on Apr. 15, 1999, now abandoned, said application No. 10/379,393 is a continuation of application No. 09/998,763, filed on Nov. 29, 2001, now Pat. No. 6,738,495, which is a division of application No. 09/292,569, filed on Apr. 15, 1999, now abandoned.

(60) Provisional application No. 60/082,228, filed on Apr. 16, 1998.

(51) Int. Cl.
G06K 9/36     (2006.01)
G06K 9/40     (2006.01)
G06K 9/00     (2006.01)

(52) U.S. Cl. ...................................... 382/232; 382/100
(58) Field of Classification Search ................ 382/100, 382/181, 232, 235, 239
See application file for complete search history.

(56) References Cited

U.S. PATENT DOCUMENTS

| | | | |
|---|---|---|---|
| 4,807,031 A | 2/1989 | Broughton et al. |
| 4,939,515 A | 7/1990 | Adelson |
| 5,079,648 A | 1/1992 | Maufe |
| 5,113,445 A | 5/1992 | Wang |
| 5,243,423 A | 9/1993 | DeJean et al. |
| 5,319,735 A | 6/1994 | Preuss et al. |
| 5,410,598 A | 4/1995 | Shear |
| 5,448,053 A | 9/1995 | Rhoads |
| 5,495,581 A | 2/1996 | Tsai |
| 5,519,778 A | 5/1996 | Leighton et al. |
| 5,612,943 A | 3/1997 | Moses et al. |

(Continued)

FOREIGN PATENT DOCUMENTS

EP        493091        7/1992

(Continued)

OTHER PUBLICATIONS

Bors et al., "Image Watermarking Using DCT Domain Constraints," Proc. IEEE Int. Conf. on Image Processing, vol. 3, Sep. 1996, pp. 231-234.

(Continued)

Primary Examiner—Wes Tucker

(57) ABSTRACT

The present invention relates generally to digital watermarking, steganographic data hiding, and data compression. One claim recites a method including: obtaining media comprising imagery or audio; obtaining plural-bit data; embedding the plural-bit data in the media with digital watermarking, the digital watermarking altering data representing the media; and adjusting compression of the media in accordance with at least one characteristic associated with the digital watermarking. Other claims and combinations are provided as well.

17 Claims, 5 Drawing Sheets

U.S. PATENT DOCUMENTS

| | | |
|---|---|---|
| 5,613,004 A | 3/1997 | Cooperman et al. |
| 5,629,980 A | 5/1997 | Stefik et al. |
| 5,636,292 A | 6/1997 | Rhoads |
| 5,646,997 A | 7/1997 | Barton |
| 5,646,999 A | 7/1997 | Saito |
| 5,687,191 A | 11/1997 | Lee et al. |
| 5,687,236 A | 11/1997 | Moskowitz et al. |
| 5,721,788 A | 2/1998 | Powell et al. |
| 5,734,752 A | 3/1998 | Knox |
| 5,765,152 A | 6/1998 | Erickson |
| 5,768,426 A | 6/1998 | Rhoads |
| 5,778,102 A | 7/1998 | Sandford, II et al. |
| 5,790,703 A | 8/1998 | Wang |
| 5,809,139 A | 9/1998 | Girod et al. |
| 5,825,892 A | 10/1998 | Braudaway et al. |
| 5,841,978 A | 11/1998 | Rhoads |
| 5,845,281 A | 12/1998 | Benson et al. |
| 5,848,413 A | 12/1998 | Wolff |
| 5,943,422 A | 12/1998 | Wong et al. |
| 5,862,260 A | 1/1999 | Rhoads |
| 5,875,249 A | 2/1999 | Mintzer et al. |
| 5,901,178 A | 5/1999 | Lee et al. |
| 5,915,027 A | 6/1999 | Cox et al. |
| 5,930,377 A | 7/1999 | Powell et al. |
| 5,949,055 A | 9/1999 | Fleet et al. |
| 5,978,773 A | 11/1999 | Hudetz et al. |
| 5,991,876 A | 11/1999 | Johnson et al. |
| 6,037,984 A | 3/2000 | Isnardi et al. |
| 6,101,602 A | 8/2000 | Fridrich |
| 6,122,403 A | 9/2000 | Rhoads |
| 6,131,161 A | 10/2000 | Linnartz |
| 6,141,753 A | 10/2000 | Zhao et al. |
| 6,157,330 A | 12/2000 | Bruekers et al. |
| 6,163,842 A | 12/2000 | Barton |
| 6,164,534 A | 12/2000 | Rathus et al. |
| 6,185,683 B1 | 2/2001 | Ginter et al. |
| 6,205,249 B1 | 3/2001 | Moskowitz |
| 6,208,745 B1 | 3/2001 | Florencio et al. |
| 6,219,634 B1 | 4/2001 | Levine |
| 6,222,932 B1 | 4/2001 | Rao et al. |
| 6,233,684 B1 | 5/2001 | Stefik et al. |
| 6,236,971 B1 | 5/2001 | Stefik et al. |
| 6,246,777 B1 * | 6/2001 | Agarwal et al. ............. 382/100 |
| 6,252,972 B1 | 6/2001 | Linnartz |
| 6,266,419 B1 | 7/2001 | Lacy et al. |
| 6,266,430 B1 | 7/2001 | Rhoads |
| 6,272,634 B1 | 8/2001 | Tewfik et al. |
| 6,285,774 B1 | 9/2001 | Schumann et al. |
| 6,307,949 B1 | 10/2001 | Rhoads |
| 6,320,965 B1 | 11/2001 | Levine |
| 6,324,573 B1 | 11/2001 | Rhoads |
| 6,330,672 B1 | 12/2001 | Shur |
| 6,332,030 B1 * | 12/2001 | Manjunath et al. .......... 382/100 |
| 6,332,194 B1 | 12/2001 | Bloom et al. |
| 6,345,104 B1 | 2/2002 | Rhoads |
| 6,359,985 B1 | 3/2002 | Koch et al. |
| 6,381,341 B1 | 4/2002 | Rhoads |
| 6,404,898 B1 | 6/2002 | Rhoads |
| 6,411,392 B1 | 6/2002 | Bender et al. |
| 6,411,725 B1 | 6/2002 | Rhoads |
| 6,449,367 B2 | 9/2002 | Van Wie et al. |
| 6,449,377 B1 | 9/2002 | Rhoads |
| 6,470,090 B2 | 10/2002 | Oami et al. |
| 6,519,352 B2 | 2/2003 | Rhoads |
| 6,522,767 B1 | 2/2003 | Moskowitz et al. |
| 6,526,449 B1 | 2/2003 | Philyaw et al. |
| 6,542,927 B2 | 4/2003 | Rhoads |
| 6,546,113 B1 | 4/2003 | Lucas et al. |
| 6,571,220 B1 | 5/2003 | Ogino et al. |
| 6,587,821 B1 | 7/2003 | Rhoads |
| 6,701,369 B1 | 3/2004 | Philyaw |
| 6,768,808 B2 | 7/2004 | Rhoads |
| 6,807,534 B1 | 10/2004 | Erickson |
| 7,127,744 B2 | 10/2006 | Levy |
| 7,177,443 B2 | 2/2007 | Rhoads |
| 7,197,156 B1 | 3/2007 | Levy |
| 7,263,203 B2 | 8/2007 | Rhoads et al. |
| 7,373,513 B2 | 5/2008 | Levy |
| 2001/0002931 A1 | 6/2001 | Maes et al. |
| 2001/0016049 A1 | 8/2001 | Nguyen |
| 2001/0020270 A1 | 9/2001 | Yeung et al. |
| 2001/0030769 A1 | 10/2001 | Jacobs |
| 2001/0031066 A1 | 10/2001 | Meyer et al. |
| 2001/0033674 A1 | 10/2001 | Chen et al. |
| 2001/0054150 A1 | 12/2001 | Levy |
| 2002/0021823 A1 | 2/2002 | Muratani |
| 2002/0023020 A1 | 2/2002 | Kenyon et al. |
| 2002/0090111 A1 | 7/2002 | Fukushima et al. |
| 2002/0097892 A1 | 7/2002 | Oami et al. |
| 2002/0106105 A1 | 8/2002 | Pelly et al. |
| 2002/0122568 A1 | 9/2002 | Zhao |
| 2002/0124174 A1 | 9/2002 | Ehrmann-Patin et al. |
| 2002/0184502 A1 | 12/2002 | Sall et al. |
| 2004/0184369 A1 | 9/2004 | Herre et al. |
| 2004/0240846 A1 | 12/2004 | Cookson et al. |

FOREIGN PATENT DOCUMENTS

| | | |
|---|---|---|
| WO | WO95/14289 | 5/1995 |
| WO | WO96/31049 | 10/1996 |
| WO | WO96/36163 | 11/1996 |
| WO | WO97/43736 | 11/1997 |
| WO | WO01/15021 | 3/2001 |
| WO | WO0173997 | 10/2001 |

OTHER PUBLICATIONS

Cox et al., "Secure Spread Spectrum Watermarking for Multimedia," NEC Research Institute, Technical Report 95-10, pp. 1-33, Dec. 4, 1995.

Dittmann, Jana et al., "Robust MPEG Video Watermarking Technologies," ACM Multimedia '98, Bristol, UK, 1998, pp. 71-80.

Langelaar et al., "Real-time Labeling Methods for MPEG Compressed Video," Proc. 18.sup.thSymp. on Information Theory in the Benelux, May 1997, pp. 25-32.

Hartung et al., "Digital Watermarking of Raw and Compressed Video," Proc. SPIE 2952, Digital Compression Technologies and Systems for Video Communications, Oct. 1996, pp. 205-213.

Holliman et al., "Adaptive Public Watermarking of DCT-Based Compressed Images," SPIE vol. 3312, Dec. 1997, pp. 284-295.

Koch et al., "Copyright Protection for Multimedia Data," Proc. Of the Int. Conf. On Digital Media and Electronic Publishing, Leeds, U.K., Dec. 1994, 15 pages.

ORuanaidh et al., "Watermarking digital images for copyright protection," IEEE Proc-Vis. Image Signal Process, vol. 143, No. 4, pp. 250-256, Aug. 1996.

Wang et al., "Image Protection via Watermarking on Perceptually Significant Wavelet Coefficients," Proc. IEEE, Dec. 1998, pp. 279-284.

Boney et al., "Digital Watermarks for Audio Signals", IEEE 1996, pp. 473-480.

Bovik, "Handbook of Image and Video Processing", Academic Press, 2000, pp. 133-136, 154, 155.

Puate et al., "Using Fractal Compression Scheme to Embed a Digital Signature Into an Image," *SPIE* vol. 2915, Mar. 1997, pp. 108-118.

* cited by examiner

DIGITAL WATERMARKS

RELATED APPLICATION DATA

The Ser. No. 10/379,393 application is also related to application Ser. No. 09/186,962, filed Nov. 5, 1998, which is a continuation of application Ser. No. 08/649,419, filed May 16, 1996 (now U.S. Pat. No. 5,862,260), which claims priority to application PCT/US96/06618, filed May 7, 1996 (now published as WO9636163).

The Ser. No. 10/379,393 application is also related to application Ser. No. 09/442,440, filed Nov. 17, 1999, which is a continuation of application Ser. No. 08/951,858, filed Oct. 16, 1997 (now U.S. Pat. No. 6,026,193), which is a continuation of application Ser. No. 08/436,134, filed May 8, 1995 (now U.S. Pat. No. 5,748,763).

FIELD OF THE INVENTION

The present application relates to improvements in the field of digital watermarking.

BACKGROUND AND SUMMARY OF THE INVENTION

Digital watermarking ("watermarking") is a quickly growing field of endeavor, with several different approaches. The present assignee's work is reflected in the earlier-cited related applications, as well as in U.S. Pat. Nos. 5,841,978, 5,768, 426, 5,748,783, 5,748,763, 5,745,604, 5,710,834, 5,636,292, 5,721,788, and laid-open PCT applications WO97/43736 and WO99/10837 (corresponding to pending U.S. application Ser. No. 08/746,613 (now U.S. Pat. No. 6,122,403) and Ser. No. 09/138,061). Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the present disclosure it should be understood that references to watermarking encompass not only the assignee's watermarking technology, but can likewise be practiced with any other watermarking technology, such as those indicated above.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface micro-topology of a medium, localized chemical changes (e.g. in photographic emulsions), localized variations in optical density, localized changes in luminescence, etc. Watermarks can also be optically implemented in holograms and conventional paper watermarks.)

In accordance with the present invention, various improvements to digital watermarking are disclosed. For example, an improved watermarking method proceeds on an iterative basis in which the watermark data is encoded in a source signal, the result is then decoded, and the "strengths" of the individual encoded bits are discerned. The watermarking parameters are then adjusted so as to redress any deficiencies determined in the first watermarking operation, and the source signal is re-watermarked—this time with the adjusted parameters. So doing assures reliable detection of all the component bits.

The foregoing and other features and advantages of the present invention will be more readily apparent from the following Detailed Description, which proceeds with reference to the accompanying drawings.

DETAILED DESCRIPTION

Figure 1:
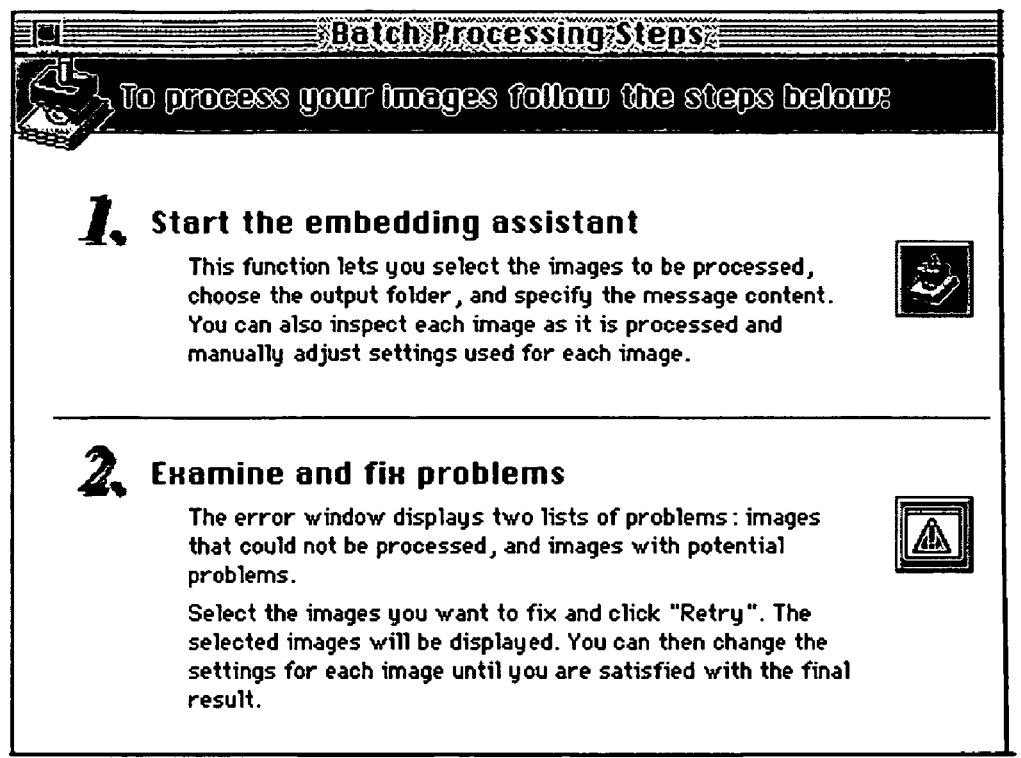
FIGS. 1-9 are screen shots associated with an exemplary embodiment of one aspect of the invention.

An improvement to existing watermark encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

While the foregoing analysis evaluated confidence on a per-bit basis, related iterative procedures can evaluate confidence on a per-portion basis. That is, the encoded object is considered in portions, and each portion is analyzed for the robustness of the data encoded thereby. In portions evidencing "weak" encoding, the encoding parameters can be adjusted to strengthen the encoding in one or more subsequent re-encoding operations.

The portions can take different forms, e.g., rectangular patches in a still or moving image; brief temporal excerpts in audio or video; certain DCT/Fourier/wavelet coefficients (or adjoining groups of coefficients) in coefficient-based representations of the object in a transformed domain, etc.

By this technique, even if the encoded object is spatially or temporally excerpted, or filtered (e.g. spectrally), there is increased assurance that the watermark energy remaining after such processing will permit accurate decoding.

In an illustrative embodiment, the process is highly automated and essentially transparent to a user. The user simply instructs a computer-controlled system to watermark an object, and the system responds by performing the trial watermarking, decoding, making successive adjustments, and repeating as necessary until a final encoded object meeting desired watermark-quality requirements is produced.

A more elaborate embodiment is a batch image processing system (implemented, e.g., in software run on a Pentium III-based personal computer system) that successively opens, watermarks, JPEG-compresses, and re-stores each image in a collection of images. Such systems are well-suited for use by proprietors of large image collections (e.g. news agencies, photo stock houses, etc.).

In such systems, any of the foregoing iterative-encoding techniques can be employed. Or other iterative encoding techniques can be used. One other such other iterative encoding technique tests a trial encoding against one or more various forms of corruption, and makes adjustments based on the results of the attempted decoding after such corruption(s). The process repeats as necessary.

In the exemplary system, the image is compressed after watermarking. Compression commonly weakens a watermark since some of the watermark signal components are typically attenuated. The watermark can be made more durable by increasing the watermark's energy, but so doing can have the effect of visibly degrading image quality. Thus, a trade-off must be struck between watermark durability and image fidelity.

A user-interface associated with the system can allow a user to select one of three watermarking modes: low, medium, and high. In the low mode, image quality is more important than watermark durability. (Such encoding is best-suited for applications in which the image is not expected to be corrupted after distribution.) In the medium mode, image quality and watermark durability are about equally important. In the high mode, watermark durability is more important than image quality.

Generally hidden from the user is a watermark intensity parameter—a parameter used by the watermarking algorithm to determine the intensity (e.g. amplitude) of the watermark signal added to the image. In the illustrative system, the parameter has a value between 1 and 16, with 1 representing the lowest-intensity watermark, and 16 representing the highest-intensity watermark. (The actual watermark energy is typically not a linear function of the parameter but can be, e.g., logarithmically related.)

The user interface can also allow the user to specify the degree of JPEG compression desired (e.g. on an arbitrary low/medium/high, or numerically defined scale), and indicate whether the compression can be adjusted—if necessary—to achieve the desired watermark durability/image quality trade-off.

In operation, the system opens the first image file, and sets an initial intensity parameter (i.e. 1 to 16) corresponding to the user's mode selection (low, medium, or high). The resulting watermarked image is then compressed in accordance with the user's instructions. A copy of the compressed file is next made and decompressed. The watermark is then decoded from the decompressed image to check that the watermarked data can be correctly read, and the strength of the watermark signal in the image is assessed.

This strength metric (which may be, e.g., signal-to-noise ratio expressed on a 1-10 scale) indicates the observed durability of the watermark. If the correct watermark was read, the strength metric is then compared against a threshold value corresponding to the selected mode of operation. (I.e. if "low" mode is selected, a relatively low threshold is set on detected strength, whereas if "high" mode is selected, a relatively high threshold is set.)

If the strength of watermark detected in the decompressed image meets or exceeds the corresponding threshold value, the trial watermarking meets the user's objectives. Thus, the compressed/watermarked image is written to a disk or other output storage device. Another file from the collection is read, and the process repeats.

If the strength of the watermark detected in the decompressed image does not meet the corresponding threshold value (or if the correct watermark was not read), the system increases the intensity value and watermarks the original image anew. The watermarked image is again compressed, and a copy made and decompressed. Again, the watermark is decoded from the decompressed image to check for accuracy, and the strength of the watermark signal in the image is assessed.

If the correct watermark was read, and the strength metric meets or exceeds the corresponding threshold, the watermarked/compressed image is written to the output storage device, and the process continues with a new image file.

If the strength of the watermark, or its readability, still don't meet spec, the intensity can be increased again and the process repeated anew. However, at some point, the intensity parameter may reach a value at which the image quality suffers unacceptably. Thus, the different modes of operation (low, medium, and optionally high) have corresponding internal intensity threshold values beyond which the system will not increase. If such threshold is reached, the system will not further increase the embedded watermark intensity. Instead, it will next adjust the compression (if the user has permitted the system—through the UI—this flexibility).

By lowering the degree of compression, encoded watermark energy better persists. An iterative watermark/compress/decompress/decode procedure thus begins in which the compression is successively backed-off until decoding yields a watermark that meets the readability requirement and strength threshold. (In an illustrated embodiment, the intensity remains fixed at the highest level permitted for that mode while this iterative procedure proceeds.)

In some systems, a threshold is set beyond which the degree of compression cannot be lowered (again, for quality concerns). If this threshold is reached, and the decoded watermark still does not meet the readability and strength tests, then the image is set-aside for later manual consideration by the operator, and the process continues anew with the next image. (The same type of exception handling occurs if the user has not permitted the system to adjust the compression, and the strength/readability tests cannot be met with watermark intensity within the permitted range.)

In these iterative systems, processing speed will depend on the size of the increments by which the parameters (e.g. encoding intensity, compression) are successively adjusted. In some embodiments, a fine level of granularity is employed (e.g. changing the intensity by a unit value on successive iterations). In others, larger increments are used. In still others, binary search-type algorithms can be used to hone-in on a nearly-optimal value in a relatively short time.

Figure 2:
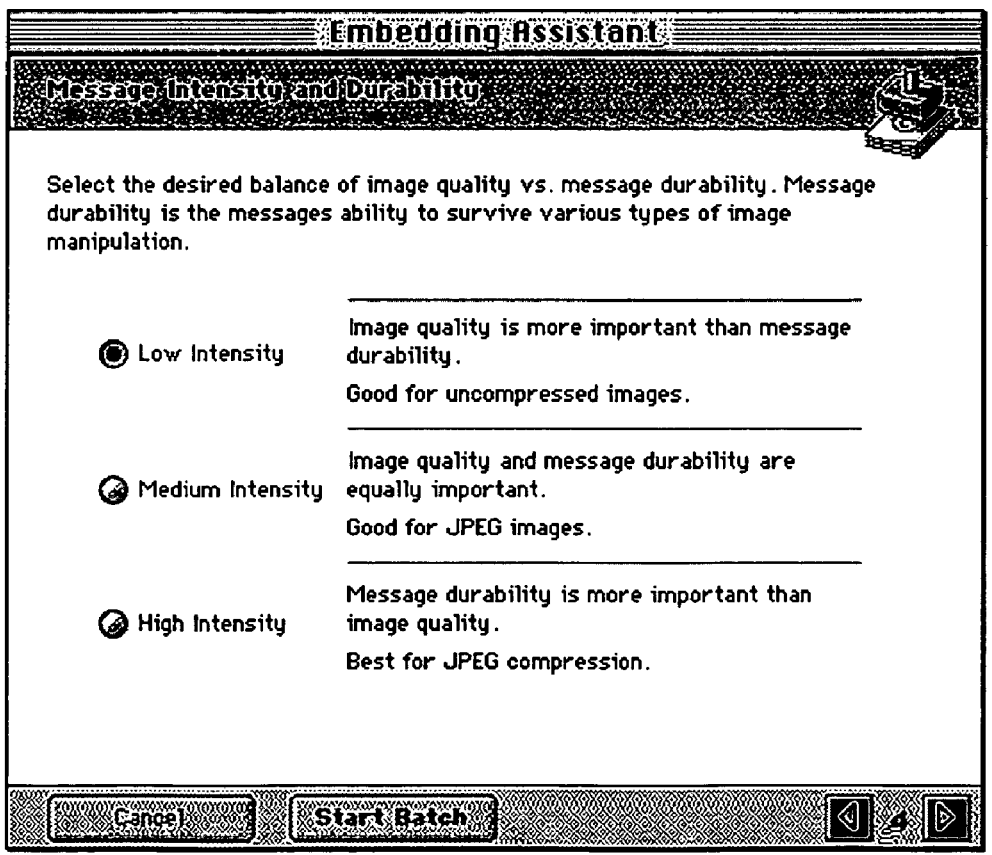

The Figures show illustrative screen shots for use in an embodiment implementing certain of the foregoing features. FIG. 1 shows an initial screen, allowing the user to select between (1) starting the batch embedding; or (2) reviewing exceptions/errors from a previous batch embedding process and taking remedial actions (e.g., per FIG. 9 below). FIG. 2 shows the UI permitting the user to specify the mode of operation desired (i.e., low/medium/high).

Figure 3:
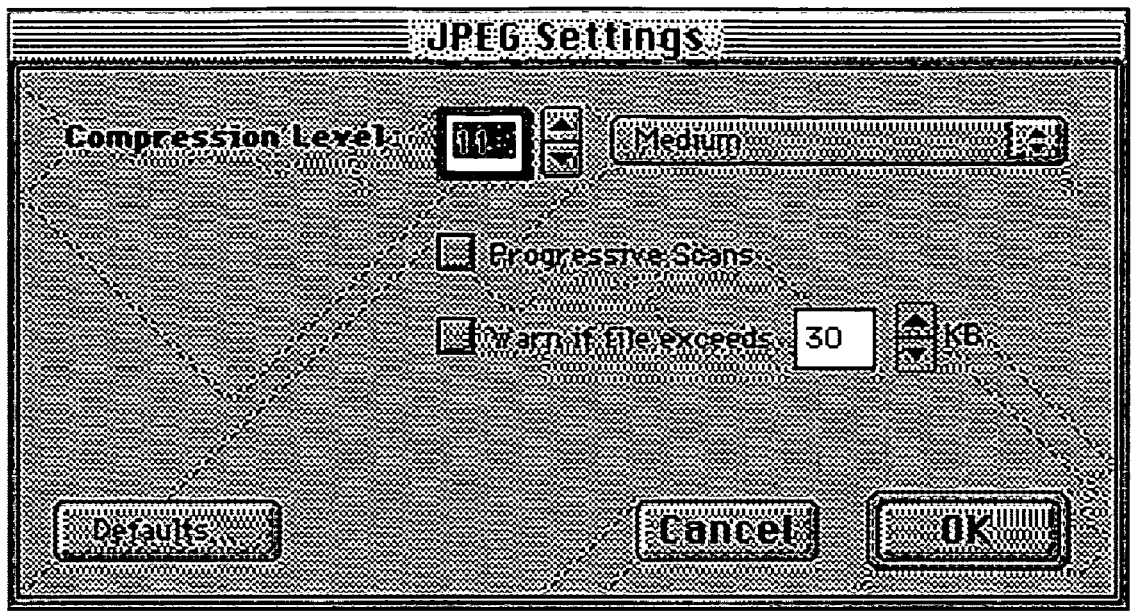

FIG. 3 shows a UI for selecting the desired degree of compression, which can be specified either as low, medium, or high, or by setting a numerical compression parameter. The UI of FIG. 3 also allows the user to request a warning if the compressed image file is larger than a specified size, and permits the user to specify progressive scans.

Figure 4:
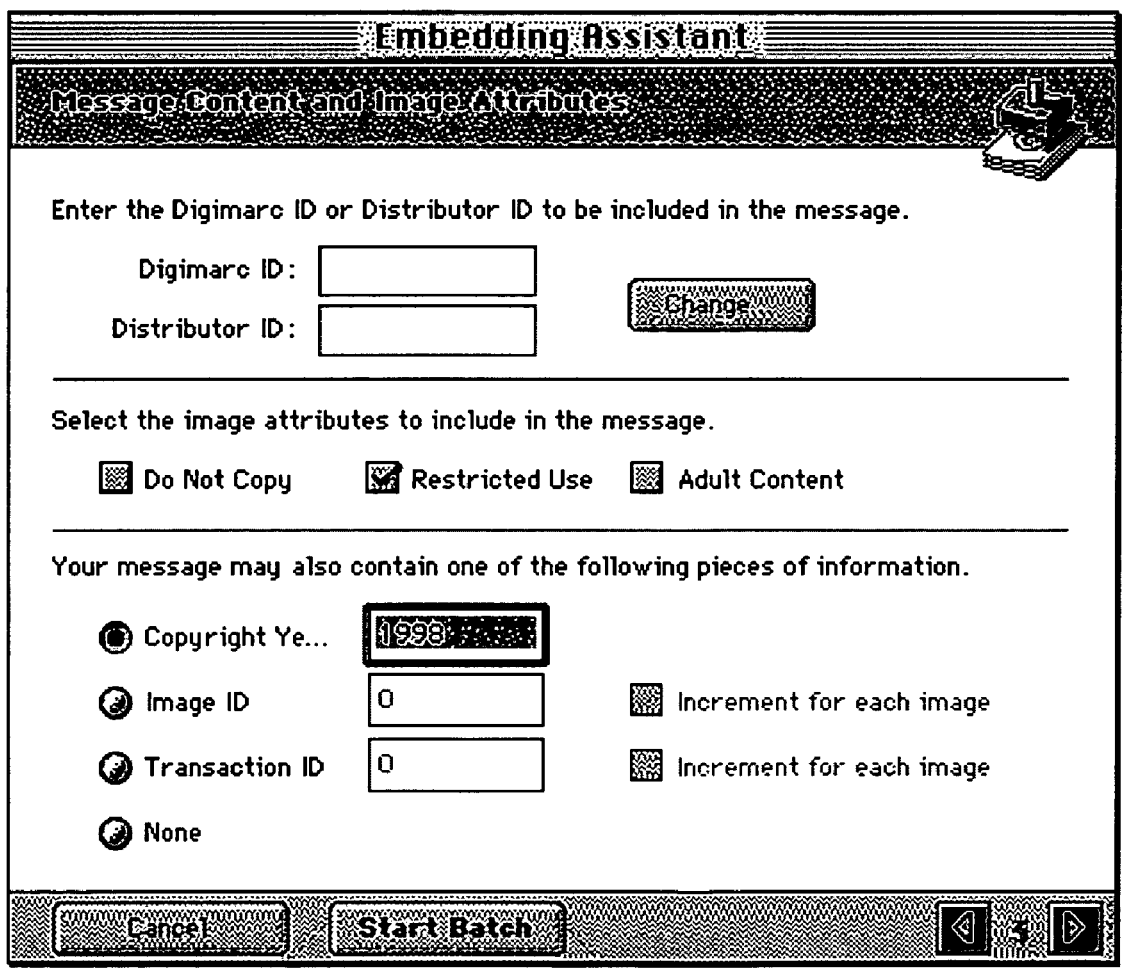

FIG. 4 shows a UI permitting the user to specify the watermark payload with which the images are to be encoded. Among the fields are Digimarc ID, Distributor ID, Do Not Copy flag, Restricted Use flag, Adult Content Flag, Copyright Year, Image ID, and Transaction ID. The UI also permits the user to specify that certain IDs are to be incremented for each successive image in the batch.

Figure 5:
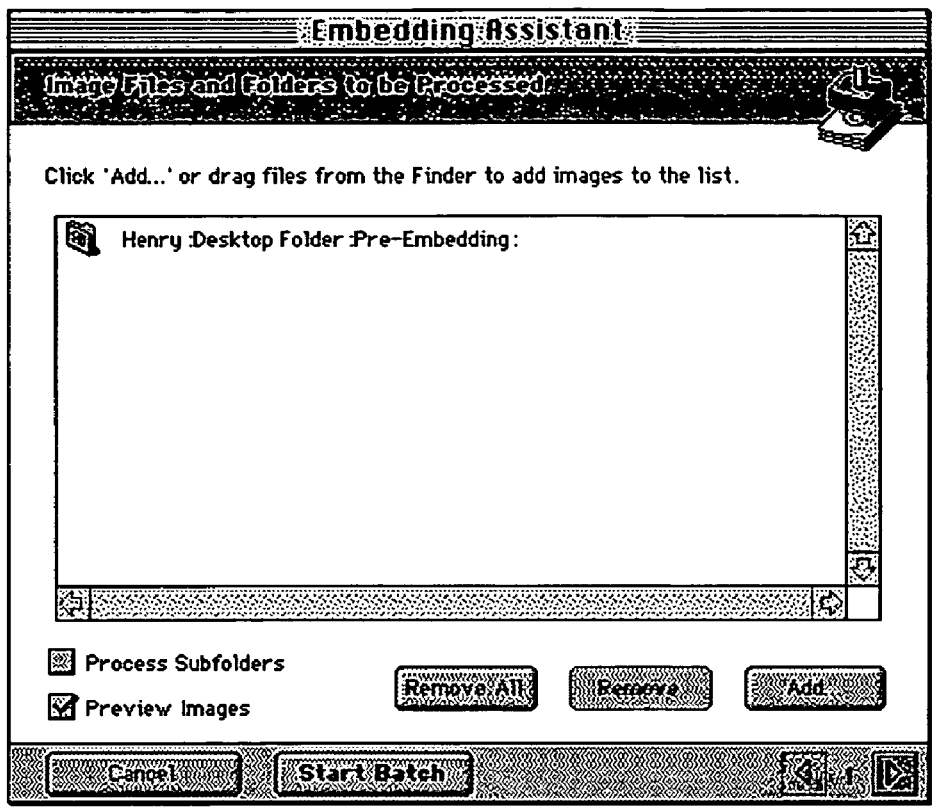

FIG. 5 shows a UI permitting the user to specify the location of images to be processed. The UI optionally allows the user to preview images as part of the process.

Figure 6:
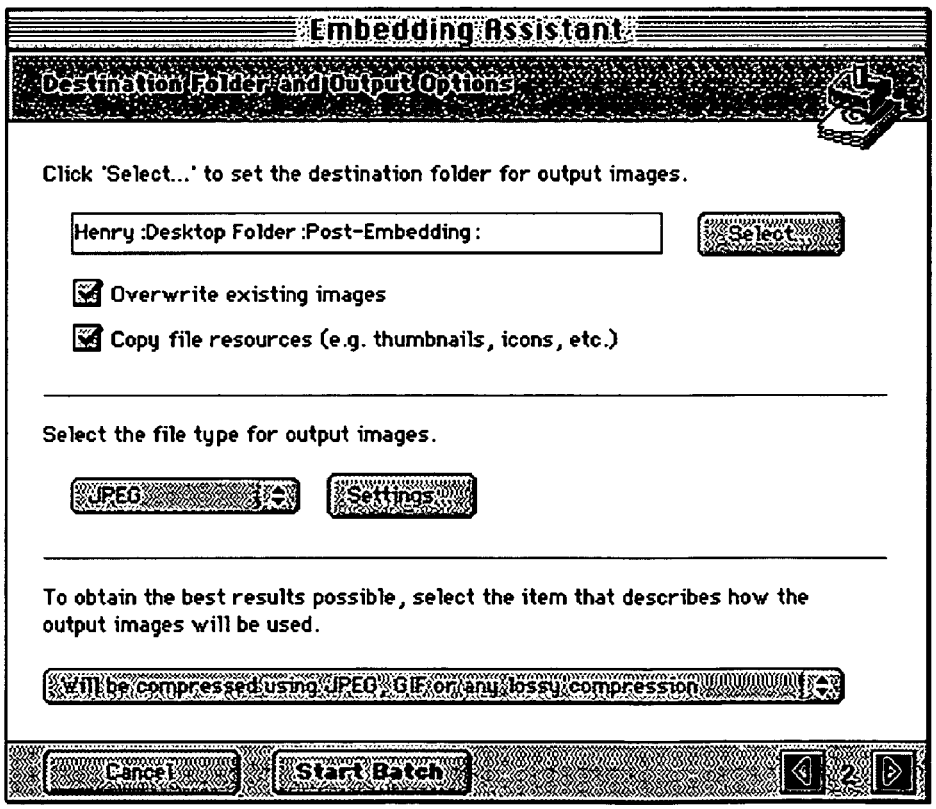

FIG. 6 shows a UI permitting the user to specify a destination folder for the watermarked images, and output options (e.g. file format).

Figure 7:
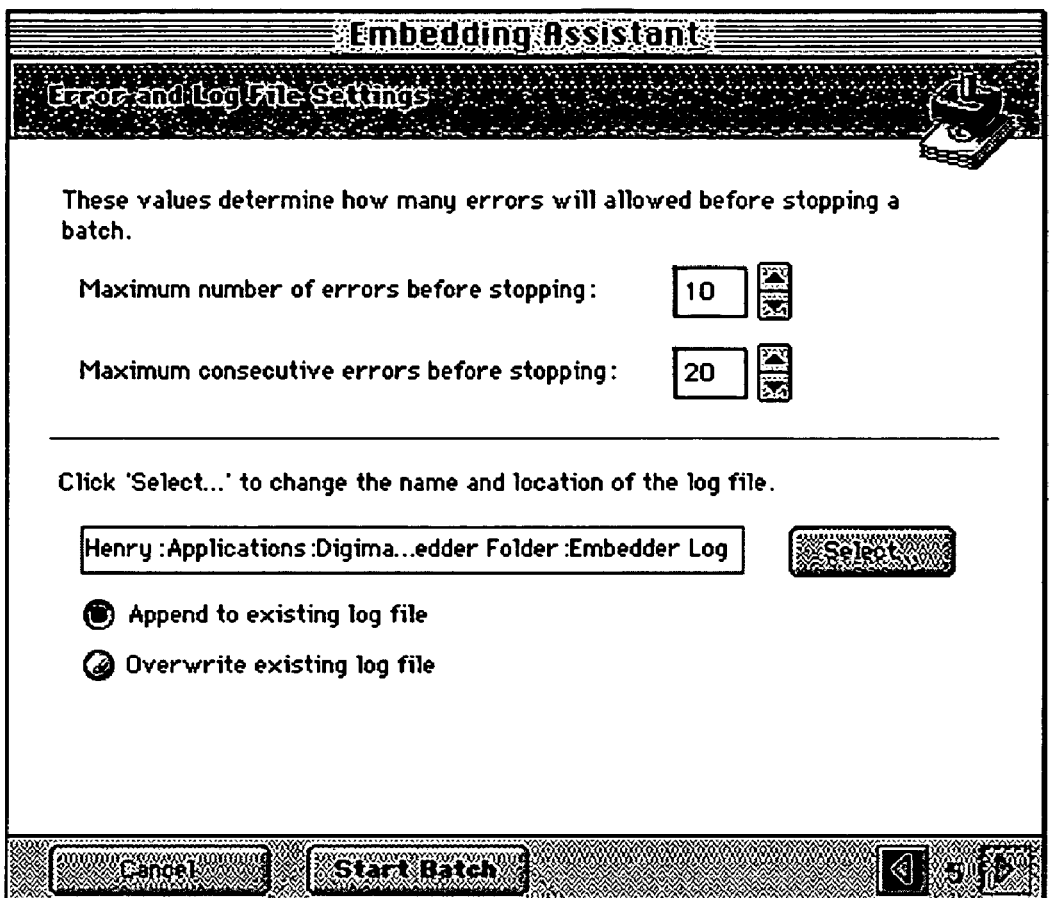

FIG. 7 shows a UI permitting the user to specify error and log file settings (e.g. specifying maximum number of errors before stopping, and maximum consecutive errors before stopping).

Figure 8:
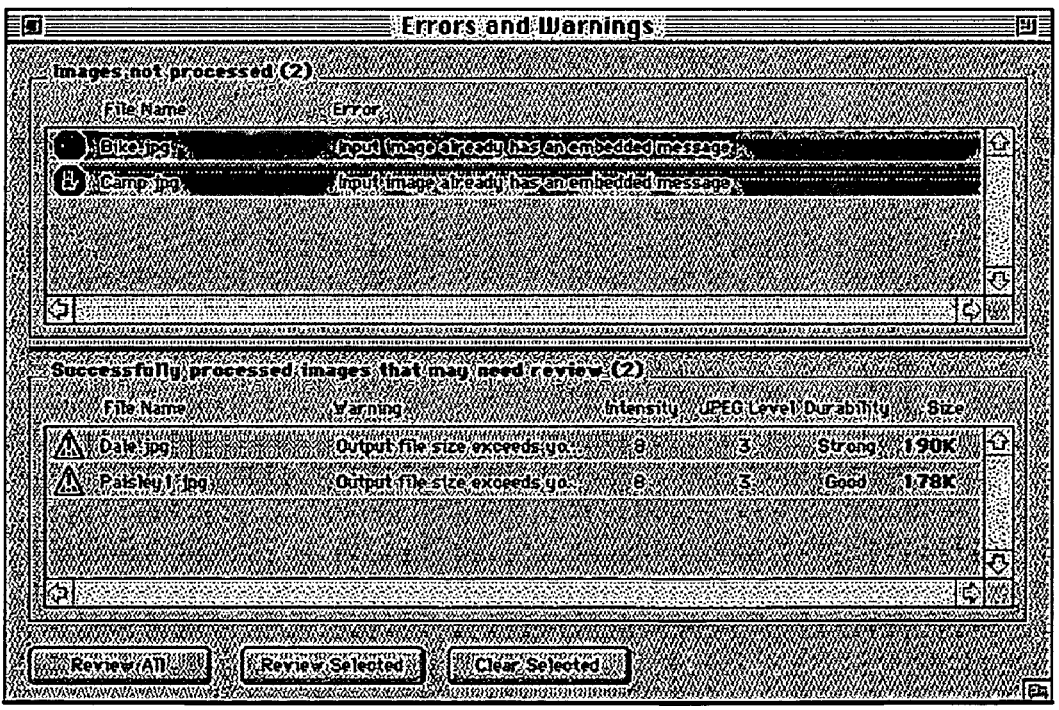

FIG. 8 shows a UI presenting errors and warnings to a user, e.g., after a batch of image files has been processed. Included with the error listings are files that were not processed (e.g. because they were found to already have a watermark). Included with the warning listings are files whose size, after compression, exceeded the earlier-specified maximum file size (FIG. 3). The UI also permits the user to review all or selected files.

Figure 9:

FIG. 9 shows a UI that presents an image for review, both after and before encoding/compression, and indicating the size of each image. The screen also includes UI controls permitting the user to adjust the intensity (on the 1 to 16 scale) and the JPEG compression level (either on a low/medium/high scale, or by numerical parameter). After the user has made any desired changes, the "Next Image" button permits the next image to be displayed and processed.

(Although the just-described arrangement adjusted the intensity until a threshold was reached, and only then adjusted compression, in other systems this need not be the case. For example, variations in intensity and compression might be alternated until a suitable result is achieved.)

While the just-discussed system checked robustness of the watermark against JPEG-distortion (i.e. a lossy compression/decompression process), the same procedure can be adapted to other types of expected distortion. For example, if an image is expected to be printed and then scanned, such distortion might be modeled by down-sampling and blur-filtering. The system can check trial encodings against such distortion, and adjust the intensity (or other parameter) as needed to provide a desired degree of durability against such corruption.

Likewise, while the just-discussed system checked trial encoding for two performance metrics (e.g., accurate decoding, and strength of watermark meeting a threshold), in other embodiments different performance metrics can be employed. Other sample metrics include, but are not limited to: speed of watermark decoding being within a threshold; change (i.e. increase or decrease) in bit-rate (e.g. for MPEG video or MP3/MP4 audio) being within a threshold; change in entropy (in the encoded vs. un-encoded object) being within a threshold, etc. (Changes in bit-rate and entropy resulting from watermarking are reviewed, e.g., in WO 99/10837.)

In addition to testing for watermark robustness after image compression/decompression, the just-described embodiment also included image compression as part of the batch processing. Of course, this step could be omitted, and/or other processing steps (e.g. filtering, cropping, format translation, etc.) desired by the user could be included.

Watermarking can be applied to myriad forms of information. These include imagery (including video) and audio—whether represented in digital form (e.g. an image comprised of pixels, digital or MPEG video, MP3/MP4 audio, etc.), or in an analog representation (e.g. non-sampled music, printed imagery, banknotes, etc.) Watermarking can be applied to digital content (e.g. imagery, audio) either before or after compression. Watermarking can also be used in various "description" or "synthesis" language representations of content, such as Structured Audio, Csound, NetSound, SNHC Audio and the like (c.f. http://sound.media.mit.edu/mpeg4/) by specifying synthesis commands that generate watermark data as well as the intended audio signal. Watermarking can also be applied to ordinary media, whether or not it conveys information. Examples include paper, plastics, laminates, paper/film emulsions, etc. A watermark can embed a single bit of information, or any number of bits.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface micro-topology of a medium, localized chemical changes (e.g. in photographic emulsions), localized variations in optical density, localized changes in luminescence, etc. Watermarks can also be optically implemented in holograms and conventional paper watermarks.

One improvement to existing technology is to employ established web crawler services (e.g. AltaVista, Excite, or Inktomi) to search for watermarked content (on the Web, in internet news groups, BBS systems, on-line systems, etc.) in addition to their usual data collecting/indexing operations. Such crawlers can download files that may have embedded watermarks (e.g. *.JPG, *.WAV, etc.) for later analysis. These files can be processed, as described below, in real time. More commonly, such files are queued and processed by a computer distinct from the crawler computer. Instead of performing watermark-read operations on each such file, a screening technique can be employed to identify those most likely to be conveying watermark data. One such technique is to perform a DCT operation on an image, and look for spectral coefficients associated with certain watermarking techniques (e.g. coefficients associated with an inclined embedded subliminal grid). To decode spread-spectrum based watermarks, the analyzing computer requires access to the noise signal used to spread the data signal. In one embodiment, interested parties submit their noise/key signals to the crawler service so as to enable their marked content to be located. The crawler service maintains such information in confidence, and uses different noise signals in decoding an image (image is used herein as a convenient shorthand for imagery, video, and audio) until watermarked data is found (if present). This allows the use of web crawlers to locate content with privately-coded watermarks, instead of just publicly-coded watermarks, as is presently the case. The queuing of content data for analysis provides certain opportunities for computational shortcuts. For example, like-sized images (e.g. 256×256 pixels) can be tiled into a larger image, and examined as a unit for the presence of watermark data. If the decoding technique (or the optional pre-screening technique) employs a DCT transform or the like, the block size of the transform can be tailored to correspond to the tile size (or some integral fraction thereof). Blocks indicated as likely having watermarks can then be subjected to a full read operation. If the queued data is sorted by file name, file size, or checksum, duplicate files can be identified. Once such duplicates are identified, the analysis computer need consider only one instance of the file. If watermark data is decoded from such a file, the content provider can be informed of each URL at which copies of the file were found.

Some commentators have observed that web crawler-based searches for watermarked images can be defeated by breaking a watermarked image into sub-blocks (tiles). HTML instructions, or the like, cause the sub-blocks to be presented in tiled fashion, recreating the complete image. However, due to the small size of the component sub-blocks, watermark reading is not reliably accomplished.

This attack is overcome by instructing the web-crawler to collect the display instructions (e.g. HTML) by which image files are positioned for display on a web page, in addition to the image files themselves. Before files collected from a web page are scrutinized for watermarks, they can be concatenated in the arrangement specified by the display instructions. By this arrangement, the tiles are reassembled, and the watermark data can be reliably recovered.

Another such postulated attack against web crawler detection of image watermarks is to scramble the image (and thus the watermark) in a file, and employ a Java applet or the like to unscramble the image prior to viewing. Existing web crawlers inspect the file as they find it, so the watermark is not detected. However, just as the Java descrambling applet can be invoked when a user wishes access to a file, the same applet can similarly be employed in a web crawler to overcome such attempted circumvention of watermark detection.

Although "content" can be located and indexed by various web crawlers, the contents of the "content" are unknown. A *.JPG file, for example, may include pornography, a photo of a sunset, etc.

Watermarks can be used to indelibly associate meta-data within content (as opposed to stored in a data structure that forms another part of the object, as is conventionally done with meta-data). The watermark can include text saying "sunset" or the like. More compact information representations can alternatively be employed (e.g. coded references). Still further, the watermark can include (or consist entirely of) a Unique ID (UID) that serves as an index (key) into a network-connected remote database containing the meta data descriptors. The remote data may contain meta-data described by an extensible markup language (XML) tag set. By such arrangements, web crawlers and the like can extract and index the meta-data descriptor tags, allowing searches to be conducted based on semantic descriptions of the file contents, rather than just by file name.

Existing watermarks commonly embed information serving to communicate copyright information. Some systems embed text identifying the copyright holder. Others embed a UID which is used as an index into a database where the name of the copyright owner, and associated information, is stored.

Looking ahead, watermarks should serve more than as silent copyright notices. One option is to use watermarks to embed "intelligence" in content. One form of intelligence is knowing its "home." "Home" can be the URL of a site with which the content is associated. A photograph of a car, for example, can be watermarked with data identifying the web site of an auto-dealer that published the image. Wherever the image goes, it serves as a link back to the original disseminator. The same technique can be applied to corporate logos. Wherever they are copied on the internet, a suitably-equipped browser or the like can decode the data and link back to the corporation's home page. (Decoding may be effected by positioning the cursor over the logo and pressing the right-mouse button, which opens a window of options—one of which is Decode Watermark.)

To reduce the data load of the watermark, the intelligence need not be wholly encoded in the content's watermark. Instead, the watermark can again provide a UID—this time identifying a remote database record where the URL of the car dealer, etc., can be retrieved. In this manner, images and the like become marketing agents—linking consumers with vendors (with some visual salesmanship thrown in). In contrast to the copyright paradigm, in which dissemination of imagery was an evil sought to be tracked and stopped, dissemination of the imagery can now be treated as a selling opportunity. A watermarked image becomes a portal to a commercial transaction.

(Using an intermediate database between a watermarked content file and its ultimate home (i.e. indirect linking) serves an important advantage: it allows the disseminator to change the "home" simply by updating a record in the database. Thus, for example, if one company is acquired by another, the former company's smart images can be made to point to the new company's home web page by updating a database record. In contrast, if the old company's home URL is hard-coded (i.e. watermarked) in the object, it may point to a URL that eventually is abandoned. In this sense, the intermediate database serves as a switchboard that couples the file to its current home.

The foregoing techniques are not limited to digital content files. The same approach is equally applicable with printed imagery, etc. A printed catalog, for example, can include a picture illustrating a jacket. Embedded in the picture is watermarked data. This data can be extracted by a simple hand-scanner/decoder device using straightforward scanning and decoding techniques (e.g. those known to artisans in those fields). In watermark-reading applications employing hand-scanners and the like, it is important that the watermark decoder be robust to rotation of the image, since the catalog photo will likely be scanned off-axis. One option is to encode subliminal graticules (e.g. visualization synchronization codes) in the catalog photo so that the set of image data can be post-processed to restore it to proper alignment prior to decoding.

The scanner/decoder device can be coupled to a modem-equipped computer, a telephone, or any other communications device. In the former instance, the device provides URL data to the computer's web browser, linking the browser to the catalog vendor's order page. (The device need not include its own watermark decoder; this task can be performed by the computer.) The vendor's order page can detail the size and color options of the jacket, inventory availability, and solicit ordering instructions (credit card number, delivery options, etc.)—as is conventionally done with on-line merchants. Such a device connected to a telephone can dial the catalog vendor's toll-free automated order-taking telephone number (known, e.g., from data encoded in the watermark), and identify the jacket to the order center. Voice prompts can then solicit the customer's choice of size, color, and delivery options, which are input by Touch Tone instructions, or by voiced words (using known voice recognition software at the vendor facility).

In such applications, the watermark may be conceptualized as an invisible bar code employed in a purchase transaction.

Here, as elsewhere, the watermark can serve as a seamless interface bridging the print and digital worlds Another way of providing content with intelligence is to use the watermark to provide Java or ActiveX code. The code can be embedded in the content, or can be stored remotely and linked to the content. When the watermarked object is activated, the code can be executed (either automatically, or at the option of the user). This code can perform virtually any function. One is to "phone home"—initiating a browser and linking to the object's home The object can then relay any manner of data to its home. This data can specify some attribute of the data, or its use. The code can also prevent accessing the underlying content until permission is received. An example is a digital movie that, when double-clicked, automatically executes a watermark-embedded Java applet which links through a browser to the movie's distributor. The user is then prompted to input a credit card number. After the number has been verified and a charge made, the applet releases the content of the file to the computer's viewer for viewing of the movie. Support for these operations is desirably provided via the computer's operating system, or plug-in software.

Similar functionality can be provided with an operating system to trigger special treatment of watermarked content, provided the operating system is aware of the content type (e.g. in an object-oriented file system, or in a file system that is "media aware"). One exemplary application is in the acquisition of content from external audio/image/video devices.

Such arrangements can also be used to collect user-provided demographic information when smart image content is accessed by the consumer of the content. The demographic information can be written to a remote database and can be used for market research, customization or personalization of information about the content provided to the consumer, sales opportunities, advertising, etc.

In audio and video and the like, watermarks can serve to convey related information, such as links to WWW fan sites, actor biographies, advertising for marketing tie-ins (T-shirts, CDs, concert tickets). In such applications, it is desirable (but not necessary) to display on the user interface (e.g. screen) a small logo to signal the presence of additional information. When the consumer selects the logo via some selection device (mouse, remote control button, etc.), the information is revealed to the consumer, who can then interact with it.

Much has been written (and patented) on the topic of asset rights management. Sample patent documents include U.S. Pat. Nos. 5,715,403, 5,638,443, 5,634,012, 5,629,980. Again, much of the technical work is memorialized in journal articles, which can be identified by searching for relevant company names and trademarks such as IBM's Cryptolope system, Portland Software's ZipLock system, the Rights Exchange service by Softbank Net Solutions, and the Digi-Box system from InterTrust Technologies.

An exemplary asset management system makes content available (e.g. from a web server, or on a new computer's hard disk) in encrypted form. Associated with the encrypted content is data identifying the content (e.g. a preview) and data specifing various rights associated with the content. If a user wants to make fuller use of the content, the user provides a charge authorization (e.g. a credit card) to the distributor, who then provides a decryption key, allowing access to the content. (Such systems are often realized using object-based technology. In such systems, the content is commonly said to be distributed in a "secure container.")

Other asset management systems deliver content "in the clear"—not encrypted or in a secure container. Such arrangements are common, e.g., in enterprise asset management systems (as opposed, for example, to e-commerce applications where container-based approaches are prevalent).

Desirably, the content should be marked (personalized/serialized) so that any illicit use of the content can be tracked. This marking can be performed with watermarking, which assures that the mark travels with the content wherever—and in whatever form—it may go. The watermarking can be effected by the distributor—prior to dissemination of the (encrypted) object—such as by encoding a UID that is associated in a database with that particular container. When access is provided to the content (e.g. an access right is granted to a secure container, or non-encrypted content is made available to a user), the database record can be updated to reflect the purchaser/user, the purchase date, the rights granted, etc. An alternative is to include a watermark encoder in the software tool used to access the content (e.g. a decryption engine, for secure container-based systems). Such an encoder can embed watermark data in the content before it is provided to the user (e.g. before it is released from the container, in secure container systems). The embedded data can include a UID, as described above. This UID can be assigned by the distributor prior to disseminating the content/container. Alternatively, the UID can be a data string not known or created until access (or the right to access) has been granted. In addition to the UID, the watermark can include other data not known to the distributor, e.g. information specific to the time(s) and manner(s) of accessing the content.

In still other non-container-based systems, access rights can again be implemented realized with watermarks. Full resolution images, for example, can be freely available on the web. If a user wishes to incorporate the imagery into a web page or a magazine, the user can interrogate the imagery as to its terms and conditions of use. This may entail linking to a web site specified by the embedded watermark (directly, or through an intermediate database), which specifies the desired information. The user can then arrange the necessary payment, and use the image knowing that the necessary rights have been secured.

Tagging of image/video/audio assets at the time of their end-user distribution (e.g. from a managed content repository) need not consist exclusively of a UID. Other data can also be watermarked into the content, e.g. a serial number, the identity of the recipient, the date of distribution, etc. Additionally, the watermarked data can serve to establish a persistent link to meta-data contained in an associated asset management database.

As noted, digital watermarks can also be realized using conventional (e.g. paper) watermarking technologies. Known techniques for watermarking media (e.g. paper, plastic, polymer) are disclosed in U.S. Pat. Nos. 5,536,468, 5,275,870, 4,760,239, 4,256,652, 4,370,200, and 3,985,927 and can be adapted to display of a visual watermark instead of a logo or the like. Note that some forms of traditional watermarks which are designed to be viewed with transmissive light can also show up as low level signals in reflective light, as is typically used in scanners. Transmissive illumination detection systems can also be employed to detect such watermarks, using optoelectronic traditional-watermark detection technologies known in the art.

As also noted, digital watermarks can be realized as part of optical holograms. Known techniques for producing and securely mounting holograms are disclosed in U.S. Pat. Nos. 5,319,475, 5,694,229, 5,492,370, 5,483,363, 5,658,411 and 5,310,222. To watermark a hologram, the watermark can be represented in the image or data model from which the holographic diffraction grating is produced. In one embodiment, the hologram is produced as before, and displays an object or symbol. The watermark markings appear in the background of the image so that they can be detected from all viewing angles. In this context, it is not critical that the watermark representation be essentially imperceptible to the viewer. If desired, a fairly visible noise-like pattern can be used without impairing the use to which the hologram is put.

Digital watermarks can also be employed in conjunction with labels and tags. In addition to conventional label/tag printing processes, other techniques—tailored to security—can also be employed. Known techniques useful in producing security labels/tags are disclosed in U.S. Pat. Nos. 5,665,194, 5,732,979, 5,651,615, and 4,268,983. The imperceptibility of watermarked data, and the ease of machine decoding, are some of the benefits associated with watermarked tags/labels. Additionally, the cost is far less than many related technologies (e.g. holograms). Watermarks in this application can be used to authenticate the originality of a product label, either to the merchant or to the consumer of the associated product, using a simple scanner device, thereby reducing the rate of counterfeit product sales.

Conveniently ignoring for the time being the inevitable social ramifications of the following apparatus, consider a steganographic setup whereby a given computing system which is based on a "master clock" driving function can, with a small modification, impress a signal upon its electrical operations that could uniquely identify the computing system when that system communicates digitally with a second computing system. The slight modification referred to would be such that it would not interfere at all with the basic operation of the first computing system, nor interfere with the communications between the two systems.

The social ramifications referred to allude to the idea that there still exists the notion of pure anonymity within an internet context and the associated idea of the right to privacy. The "good" of this notion seems to be that non-anonymity can be the seed for exploitation, while the "bad" of this notion seems to be an illusory escape from responsibility for one's own actions. Be this as it all may, there still seems to be ground for the socially neutral concept of simply identifying a given physical object relative to its neighbors, hence the following approach to impressing a unique signal onto a computing system such that a second system in communication with the first can identify the first.

Using spread spectrum principles (e.g. where a "noise like" carrier signal is modulated by an information signal to yield a data signal), the instantaneous phase of a computer's clock signal is modulated to convey steganographically encoded data. In one embodiment, the phase of the clock frequency is instantaneously varied in accordance with the data signal. (In some embodiments, the data signal needn't reflect modulation with a noise-like carrier signal; the unaltered information signal can be sent.) In an illustrative system, the period of the clock signal is 3 nanoseconds, and the instantaneous phase shifting is on the order of +/−10 picoseconds. (These figures will, of course, depend on the particular microprocessor used, and its tolerance for phase noise while still performing within specification.) If a binary "1" is to be encoded, the phase is advanced 10 picoseconds. If a binary "0" is to be encoded, the phase is retarded 10 picoseconds. Successive clock edges are successively advanced or retarded in accordance with corresponding bits of the data signal until the end of data is reached. Then the data signal desirably repeats, so as to provide redundant encoding.

Such modulation of the computer's clock system will be manifested throughout its operation, including in its communication with connected devices. Thus, for example, a modem or network connection will convey data that is influenced by the phase modulation of the clock signal. In particular, the signal transitions in any such communication (e.g. RS-232, TCP/IP, wireless modem broadcasts, etc.) will not occur on uniformly-spaced clock edges, but instead will occur on clock edges whose exact temporal characteristics vary slightly in accordance with the data signal with which the clock has been modulated.

A remote computer that receives information sent by such a computer can examine the timing of the signal (e.g. its edge transitions), and discern thereby the encoded data signal.

If the channel to the remote computer offers near perfect temporal fidelity (i.e. it introduces essentially no variable delay into the data's propagation), the data can be extracted by simply noting the instantaneous offset of each edge transition from its expected nominal value, and a corresponding element of the data signal is thereby identified. If the data signal was modulated by a noise-like signal, demodulation with the same noise-like signal will provide the original information signal. (No such demodulation with a noise signal is required if the original information signal served as the basis for the clock phase shifting.)

More typically, the channel to the remote computer introduces temporal distortion. An example is the internet, where different packets may follow different routings between the originating computer and the receiving computer. In such environments, a large number of data must be collected and processed to extract the data signal. For example, it may be necessary to average, or otherwise process, thousands of edge transitions corresponding to a given bit in order to determine whether the edge was advanced or retarded, and thereby decode that bit with a high degree of statistical assurance. Thus, in environments with highly variable transmission latencies (e.g. the cited internet example), a message of 100 bits might require collection and processing of on the order of a million edge transitions to assure reliable message recovery. However, given the acceleration of data rates on the internet, this may require only a few seconds of data.

In an illustrative embodiment, the master clock of the computer is controlled by a phase locked loop (PLL) circuit configured as a phase modulator and driven by the data signal. Decoding is performed by another PLL circuit, configured as a phase demodulator. (The two PLLs needn't share a common time base, since decoding can proceed by examining deviations of instantaneous edge transitions from the average clock period.) The design of such PLL phase modulators and demodulators is within the routine capabilities of an artisan in this field.

Of course, the artisan will recognize that implementations not employing PLLs can readily be devised (e.g. employing other known phase shifting/modulating techniques, delay circuits, etc.)

To provide a comprehensive disclosure without unduly lengthening this specification, applicant incorporates by reference the disclosures of the patents, laid-open international applications, and commonly-owned U.S. applications cited herein.

Having described and illustrated a number of improvements to the field of digital watermarking in particular contexts, it will be recognized that the invention is not so limited. Instead, we claim as our invention all such embodiments as come within the scope and spirit of the following claims, and equivalents thereto.

What is claimed is:

1. A method comprising:
receiving a media signal representing imagery or audio;
receiving auxiliary data to be steganographically hidden in the media signal;

receiving an indication of whether compression of the media signal can be adjusted;

utilizing a programmed multi-purpose electronic processor, hiding the auxiliary data in the media signal through alterations to data representing the media signal; and utilizing a programmed multi-purpose electronic processor, compressing the media signal in accordance with at least the indication.

2. The method of claim 1 wherein the indication further comprises information to adjust the compression of the media signal.

3. The method of claim 2 wherein the information comprises a relative degree of compression.

4. The method of claim 1 wherein the data representing the media signal comprises at least transform domain coefficients.

5. The method of claim 1 wherein the data representing the media signal comprises at least audio values or video values.

6. The method of claim 1 wherein the act of hiding utilizes at least a transform domain.

7. A method comprising:

obtaining media comprising imagery or audio;

obtaining plural-bit data;

utilizing a configured multi-purpose electronic processor, embedding the plural-bit data in the media with digital watermarking, the digital watermarking altering data representing the media; and adjusting compression of the media in accordance with at least one characteristic associated with the digital watermarking.

8. The method of claim 7 further comprising receiving an indication including information regarding how to adjust the compression of the media.

9. The method of claim 8 wherein the information comprises a relative degree of compression.

10. The method of claim 7 wherein the data representing the media comprises at least transform domain coefficients.

11. The method of claim 7 wherein the data representing the media comprises at least audio values or video values.

12. A computer readable medium comprising instructions to perform the method of claim 1.

13. A computer readable medium comprising instructions to perform the method of claim 7.

14. A programmed computing device storing instructions in memory, said instructions are executable by said programmed computing device to perform the acts of claim 7.

15. A computer readable media comprising instructions stored thereon to cause a multi-purpose electronic processor to perform the acts of claim 7.

16. A programmed computing device storing instructions in memory, said instructions are executable by said programmed computing device to perform the acts of claim 1.

17. A computer readable media comprising instructions stored thereon to cause a multi-purpose electronic processor to perform the acts of claim 1.

* * * * *